United States Patent
Nakanishi et al.

(10) Patent No.: US 11,952,016 B2
(45) Date of Patent: Apr. 9, 2024

(54) VEHICLE CONTROL APPARATUS

(71) Applicant: HONDA MOTOR CO., LTD., Tokyo (JP)

(72) Inventors: Daisuke Nakanishi, Wako (JP); Kentaro Ishisaka, Wako (JP); Yuki Imanishi, Wako (JP); Takuma Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 17/034,413

(22) Filed: Sep. 28, 2020

(65) Prior Publication Data
US 2021/0094568 A1 Apr. 1, 2021

(30) Foreign Application Priority Data
Sep. 30, 2019 (JP) .................................. 2019-179690

(51) Int. Cl.
B60W 60/00 (2020.01)
B60W 40/105 (2012.01)
B60W 50/14 (2020.01)

(52) U.S. Cl.
CPC ........ *B60W 60/005* (2020.02); *B60W 40/105* (2013.01); *B60W 50/14* (2013.01); *B60W 60/001* (2020.02); *B60W 2555/00* (2020.02)

(58) Field of Classification Search
CPC ............. B60W 60/005; B60W 60/001; B60W 40/105; B60W 50/14; B60W 2555/00
See application file for complete search history.

(56) References Cited

U.S. PATENT DOCUMENTS 6,332,108 B1 * 12/2001 Hirasago ............ B60K 31/0008
701/96
7,945,369 B2 * 5/2011 Lindqvist ............ B60W 10/184
701/96
(Continued)

FOREIGN PATENT DOCUMENTS

JP 2005-247197 A 9/2005
JP 2017-207907 A 11/2017

OTHER PUBLICATIONS

Christian Hartmann, TechDay piloted driving—The traffic jam pilot in the new Audi A8—(Year: 2017).*
(Continued)

*Primary Examiner* — Mahmoud S Ismail
*Assistant Examiner* — Gabriel Anfinrud
(74) *Attorney, Agent, or Firm* — Rankin, Hill & Clark LLP

(57) ABSTRACT

A driving assistance control section of a vehicle control apparatus has an operation state of a driver's vehicle transition from a stop state to a start-stand-by state keeping a second assistance state, if an accelerating operation larger than a predetermined first threshold acceleration is performed and there is an ahead-located vehicle, and has the driving assistance state transition from the second assistance state to a first assistance state and has the operation state transition from the stop state to the start-stand-by state if an accelerating operation larger than a predetermined second threshold acceleration is performed over a longer time than a predetermined threshold duration and there is an ahead-located vehicle, if follow-up running control is being performed in the second assistance state in which it is not necessary for a driver to hold a steering wheel to continue to have a driving assistance function performed.

11 Claims, 4 Drawing Sheets

(56) References Cited

U.S. PATENT DOCUMENTS

| | | |
|---|---|---|
| 2005/0216168 A1 | 9/2005 | Arai et al. |
| 2018/0222480 A1* | 8/2018 | Shokonji ............... B60W 40/04 |
| 2019/0263395 A1* | 8/2019 | Hoetzer ................ B60W 50/14 |
| 2019/0286128 A1* | 9/2019 | Kaji ...................... B60W 50/14 |
| 2021/0162999 A1* | 6/2021 | Lucas .................... B60W 40/08 |

OTHER PUBLICATIONS

"Status of International Standard for Autonomous Driving" uploaded on https://www8.cao.go.jp/cstp/gaiyo/sip/iinkai/jidousoukou_26/siryo26-5.pdf in Dec. 2016 by Ministry of Land, Infrastructure, Transport and Tourism of Japanese Government of Japanese Government. Discussed in p. 2 of the specification, English Abstract included, 12 pages.

* cited by examiner

VEHICLE CONTROL APPARATUS

CROSS REFERENCE TO RELATED APPLICATIONS

This application claims the foreign priority benefit under 35 U.S.C. § 119 of Japanese Patent Application No. 2019-179690 filed on Sep. 30, 2019, the disclosure of which is incorporated herein by reference.

TECHNICAL FIELD OF THE INVENTION

The present invention relates to a vehicle control apparatus for controlling a driver's vehicle for autonomous driving.

BACKGROUND OF THE INVENTION

In order to realize a vehicle which a driver is able to drive more safely and comfortably with less operations needed for driving, there have been many driving assistance technologies proposed to aim for so-called autonomous driving.

The applicant of this application has disclosed in JP2005-247197A an invention of a follow-up running control apparatus to detect objects that exist ahead of a driver's vehicle driven by a driver, determine an ahead-located vehicle for the driver's vehicle to run to follow from among the objects detected and perform follow-up running control for the ahead-located vehicle that is determined.

According to the autonomous driving related technology in JP2005-247197A, if a driver performs an accelerating operation to start the driver's vehicle when both of the driver's vehicle on which the driver is and the ahead-located vehicle are at a stop, this accelerating operation that has been performed is stored as start request information. When it is detected that the ahead-located vehicle has started, it is determined whether the driver intends to start the driver's vehicle based on the start request information.

Thus, as soon as it is determined that the driver intends to start the driver's vehicle, a control state of the driver's vehicle is switched from the stop control state to a follow-up running control state, which enables starting follow-up running control immediately.

In addition, JP2005-247197A discloses that the driver's vehicle becomes a start-stand-by state (the driver's vehicle is triggered by detecting the ahead-located vehicle starting to start) on an accelerating operation being performed when both the driver's vehicle and the ahead-located vehicle are at a stop while a low speed follow-up running control for a speed range between a stop state and a cruising speed is being performed, under which the driver's vehicle is running keeping a predetermined distance to the ahead-located vehicle (See paragraph 0028 of JP2005-247197A).

In addition, JP2017-207907A discloses that a driving mode of a driver's vehicle is switched from an autonomous driving mode to a manual driving mode (the autonomous driving mode is overridden by the manual driving mode) when a driver performs an accelerating operation while the driver's vehicle is running in the autonomous driving mode (See paragraph 0068).

SUMMARY OF THE INVENTION

The international standard of the autonomous driving has proposed several hierarchical autonomous driving levels to be set in accordance with if there is a driver requested task, how important the driver requested task is and a level of the autonomous driving. A set of requirements, which are individually fulfilled, are listed to realize each autonomous driving level, and hierarchically divided into categories. This is detailed in "Status of International Standard for Autonomous Driving: December 2016".

Suppose that there are, for instance, a couple of categories set for an autonomous driving level L2 where a system continuously performs a driving assistance function to perform limited parts of acceleration and deceleration control and steering control under the responsibility of a driver (responsible for a duty to supervise the system and a duty to monitor the surrounding around the driver's vehicle). One of the categories is a first category (category B1 belonging to L2: L2B1) that requests the driver to operate a driving operation element (Steering wheel) to have the system continuously perform a predetermined driving assistance function, and the other one of the categories is a second category (category B2 belonging to L2: L2B2) that does not request the driver to operate the driving operation element to have the system continuously perform the predetermined driving assistance function. Furthermore, suppose that there are three possible operation states to be set for each of the first category (L2B1) and the second category (L2B2), that is, a stop state, a start-stand-by state and a running state. Since the second category (L2B2) does not request a driver to operate the driving operation element to continue to have the predetermined driving assistance function performed, which is not the case with the first category (L1B1), the second category requires less driver requested tasks than the first category.

For instance, suppose that a low speed follow-up running control, which is an example of the predetermined driving assistance function, is being performed in the second category (L2B2) where a driver does not need to operate the driving operation element to continue to have the predetermined assistance function performed, while the driver's vehicle and the ahead-located vehicle are at a stop. Then, suppose that the system receives information that the driver has performed an accelerating operation.

Then, there are three kinds of actions the system can take when the system receives the information that the driver has performed the accelerating operation.

A first action is to have the operation state of the driver's vehicle transition from the stop state to the start-stand-by state while keeping the second category (L2B2) in the autonomous driving level L2. A second action is to have the category in the autonomous driving state transition from the second category (L2B2) to the first category (L2B1) and have the operation state of the driver's vehicle in the first category (L2B1) transition from the stop state to the start-stand-by state. A third action is to have the category in the autonomous driving state transition from the second category (L2B2) to the first category (L2B1) and have the operation state of the driver's vehicle in the first category (L2B1) transition from the stop state to the running state skipping the start-stand-by state.

Each of the possible actions the system can take when a driver performs an accelerating operation can be used taking into consideration the operation state of the driver's vehicle, a circumstance in which the driver's vehicle is running and a relation of the driver's vehicle with the ahead-located vehicle (inclusive of whether there is an ahead-located vehicle).

Therefore, the system has more degrees of freedom if the system can switch the vehicle operation to the most appropriate one of the three possible actions the system can take when the system obtains the information that the driver has performed the accelerating operation.

If the technology disclosed by JP2005-247197A of "the driver's vehicle becomes in the start-stand-by state based on the accelerating operation by the driver when the driver's vehicle and the ahead-located vehicle are kept stopped while the low speed follow-up running control is being performed" is applied, the system can take only an action to have the operation state of the driver's vehicle transition from the stop state to the start-stand-by state in the second category (L2B2).

On the one hand, if the technology disclosed by JP2017-207907A of "the autonomous driving mode is overridden by the manual driving mode when an accelerating operation by a driver is inputted while the driver's vehicle runs in the autonomous driving mode" is applied, the system only switches the second category (L2B2) to the first category (L2B1).

In addition, if the technology disclosed by JP2017-207907A is applied to the technology disclosed by JP2005-247197A, what the system can do is only to have the operation state of the driver's vehicle transition from the stop state to the start-stand-by state in the second category (L2B2) and switch the category of the autonomous driving from the second category (L2B2) to the first category (L2B1) in the autonomous driving level L2.

Here, the first category (L2B1) belonging to the autonomous driving level L2 corresponds to "first assistance state" in this specification on the present invention, while the second category (L2B2) belonging to the autonomous driving level L2 corresponds to "second assistance state" in this specification.

The present invention has been created in view of the above mentioned circumstances and is intended to provide a vehicle control apparatus that enables increasing degrees of freedom for the system's operation when the system receives the information that the driver has performed the accelerating operation with the driver's vehicle being at a stop while the driver's vehicle is in the second assistance state, in which no operation of the driving operation element is needed to continue a predetermined driving assistance function on the driver's vehicle.

In order to achieve the objective above mentioned, a vehicle control apparatus of the present invention has a feature of comprising a processor comprising an information receiving section receiving individually external world information inclusive of information on an indicative object that is ahead of a driver's vehicle in a running direction, accelerating operation information on an accelerating operation on the driver's vehicle, vehicle speed information on a vehicle speed of the driver's vehicle and ahead-located vehicle information inclusive of information on a vehicle speed of the driver's vehicle that is an object for the driver's vehicle to follow up, a determining section determining the ahead-located vehicle to be an object to follow up from the external world information that is received, a running control section performing running control of the driver's vehicle inclusive of follow-up running control after the ahead-located vehicle determined by the determining section within a speed range from a stop to a predetermined vehicle speed, and a driving assistance control section assisting the driver's vehicle using one of plural driving assistance states for assisting in driving the driver's vehicle, wherein the plural driving assistance states include a first assistance state (L2B1) that requires an operation on a predetermined driving operation element for keeping a predetermined driving assistance function enabled and a second assistance state (L2B1) that does not require the operation on the predetermined driving operation element for keeping the predetermined driving assistance function enabled, wherein the second assistance state (L2B2) requires less driver requested tasks than the first assistance state (L2B1), wherein any of a stop state (M0), a start-stand-by state (M1), and a running state (M2) is set as an operation state of the driver's vehicle in each of the first and second states, wherein when the running control section is performing the follow-up running control with the driving assistance state of the driver's vehicle being the second assistance state (L2B2) and with the operation state of the driver's vehicle being the stop state (M0), the driving assistance control section has the operation state of the driver's vehicle transition from the stop state (M0) to the start-stand-by state (M1) with the second assistance state (L2B2) being kept for the driving assistance state of the driver's vehicle, if the information receiving section receives the accelerating operation information that an accelerating operation that is larger than a predetermined first threshold acceleration is performed and the ahead-located vehicle information that there is an ahead-located vehicle, and the driving assistance control section has the driving assistance state of the driver's vehicle transition from the second assistance state (L2B2) to the first assistance state (L2B1) and has the operation state of the driver's vehicle in the first assistance state (L2B1) transition from the stop state to (M0) to the start-stand-by state (M1), if the information receiving section receives the accelerating operation information that an accelerating operation that is larger than a predetermined second threshold acceleration is performed over a longer time than a predetermined first threshold duration and the ahead-located vehicle information that there is an ahead-located vehicle.

According to the present invention, if the information that an accelerating operation has been performed is received when the follow-up running control is being performed with the driving assistance state of the driver's vehicle being the second assistance state and with the driver's vehicle being at a stop, switching between plural driving assistance states of the driver's vehicle and between plural operation states of the driver's vehicle can be carried out to have the driver's vehicle operate in an appropriate driving assistance state, which results in increasing the degrees of freedom for assisting in the driving operation of the driver's vehicle.

DETAILED DESCRIPTION OF EMBODIMENT

Hereinafter, a vehicle control apparatus of an embodiment of the present invention is described with reference to the drawings attached.

Members having a common function are labeled with a same sign among the drawings. In order to describe some members clearly, their shapes and sizes are schematically described and some of them are modified or exaggerated.

Configuration of Driver's Vehicle M

To begin with, a configuration of a vehicle provided with a vehicle control apparatus 100 (which is referred to as "driver's vehicle M" hereinafter) is described with reference to FIG. 1.

Figure 1:
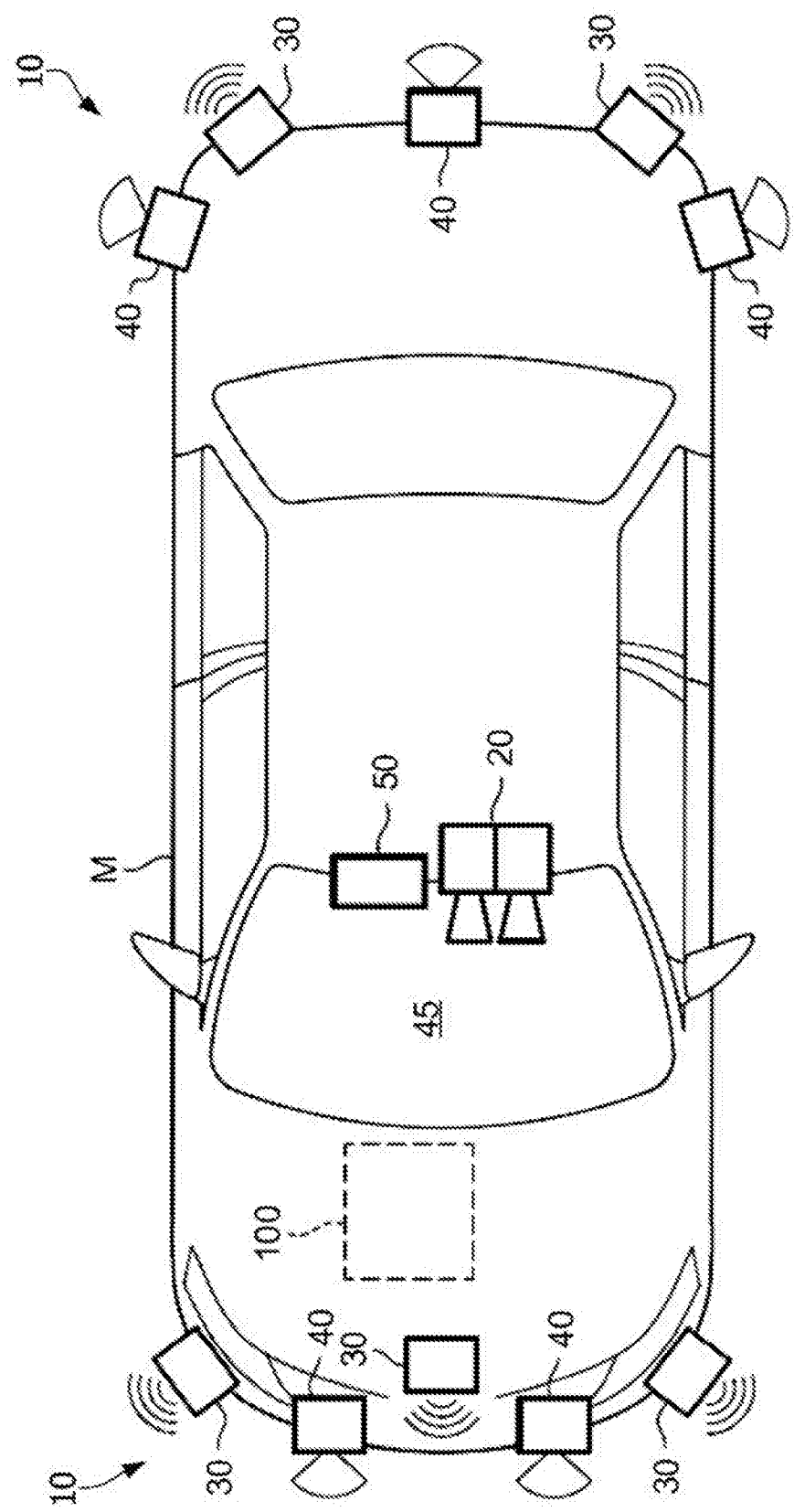
FIG. 1 shows a whole configuration of a vehicle provided with a vehicle control apparatus of an embodiment of the present invention.

FIG. 1 shows a whole configuration of the vehicle control apparatus 100 of an embodiment of the present invention.

A driver's vehicle M provided with the vehicle control apparatus 100 of the embodiment of the present invention may be, for example, a two wheel, three wheel or four wheel vehicle, as shown in FIG. 1.

The driver's vehicle M may be an automobile having a power source of an internal combustion engine such as a diesel engine or a gasoline engine, an electric vehicle having a power source of an electric motor, a hybrid automobile equipped with the internal combustion engine and the electric motor and the like. Among these, the electric vehicle is driven by electric power generated by, for example, a secondary battery, a hydrogen fuel cell, a metal fuel cell, an alcohol fuel cell and the like.

As shown in FIG. 1, the driver's vehicle M is equipped with an external world sensor 10 to detect external world information of indicative objects including an object and an indicative sign that are present around the driver's vehicle M, a navigation device 50 that maps a current position of the driver's vehicle M onto a map and indicates a route to a destination to a driver, and the vehicle control apparatus 100 that performs a function of autonomous running control of the driver's vehicle M including steering control and acceleration and deceleration control of the driver's vehicle M.

These devices and the apparatus are connected with one another through a communication medium such as CAN (Controller Area network), so that they can communicate data to one another.

The "vehicle control apparatus" of the present invention may comprise other elements (such as the external world sensor 10 or HMI 70) in addition to the "vehicle control apparatus 100".

External World Sensor 10

The external world sensor 10 may include a camera 20, a radar 30 and a lidar 40.

The camera 20 may have an optical axis extending ahead from the driver's vehicle M inclining downward and perform a function to take an image of what are present ahead of the driver's vehicle M. The camera 20 may be a CMOS (Complementary Metal Oxide Semiconductor) camera, a CCD (Charge Coupled Device) camera or the like. The camera 20 may be fixed on a center-upper portion of a windshield 45 of the driver's vehicle M.

The camera 20 may take, for instance, periodically and repeatedly images of what are present ahead of the driver's vehicle M. The camera 20 of this embodiment may be a pair of monocular cameras arranged more or less in a horizontal row. The camera 20 may be a stereo camera.

Information on an image taken by the camera 20 of what are present ahead of the driver's vehicle M is sent to the vehicle control apparatus 100 through the communication medium.

The radar 30 may be configured to perform a function to obtain information on distribution of indicative objects that are present ahead of the driver's vehicle M including a distance and a direction to each of the indicative objects, by radiating a radar wave frontward on indicative objects inclusive of an ahead-located vehicle that is running ahead of the driver's vehicle M and to be an object to follow and receiving the radar waves reflecting from the indicative objects. The radar wave may be laser, microwave, millimeter-wave, ultrasonic wave, or the like. As shown in FIG. 1, there are five radars 30 attached to the driver's vehicle M in total in this embodiment. Three radars 30 attached on the front side and a couple of radars 30 attached on the rear side of the driver's vehicle M. The information on the distribution of the indicative objects are sent to the vehicle control apparatus 100 through the communication medium.

The lidar (LIDAR: Light Detection and Ranging) 40 may be configured to perform a function to detect whether there is an indicative object and how far away the indicative object is (a distance to the object), for instance, by measuring a time from when radiating radiation light to when receiving scattered light from the indicative object. As shown in FIG. 1, there are a couple of lidars 40 attached on the front side and three lidars attached on the rear side. Information on the distribution of the indicative objects obtained with the lidars 40 is sent to the vehicle control apparatus 100 through the communication medium.

Navigation Device 50

The navigation device 50 may comprise a GNSS (Global Navigation Satellite System) receiver, map information (navigation map), a touch-panel display used as a user interface, a speaker 83 (See FIG. 3), a microphone and the like. The navigation device 50 is configured to perform a function of determining a current position of the driver's vehicle M with a GNSS receiver and calculating a route from the current position to a destination that a user inputs.

The route calculated by the navigation device 50 is sent to a target lane determining section 110 (described later) of the vehicle control apparatus 100. The current position of the driver's vehicle M can be determined by an INS (Inertial Navigation System) making use of outputs of a vehicle sensor 60 and may be determined by the INS especially when the GNSS receiver does not receives signals from navigation satellites. In addition, the navigation device 50 is configured to indicate the route to the destination to a driver with a voice or a navigation display, when the vehicle control apparatus 100 is performing a manual driving mode.

The function to determine the current position of the driver's vehicle M may be performed by other device that is separated from the navigation device 50. In addition, the functions of the navigation device 50 may be realized by functions of a remote terminal device a user owns such as a smartphone or a tablet terminal device. In this case, information is communicated between the remote terminal device and the vehicle control apparatus 100 through wire or through wireless communication.

Vehicle Control Apparatus 100 and its Peripheral Devices

Next, the vehicle control apparatus 100 of this embodiment of the present invention and its peripheral devices are described with reference to FIG. 2.

Figure 2:
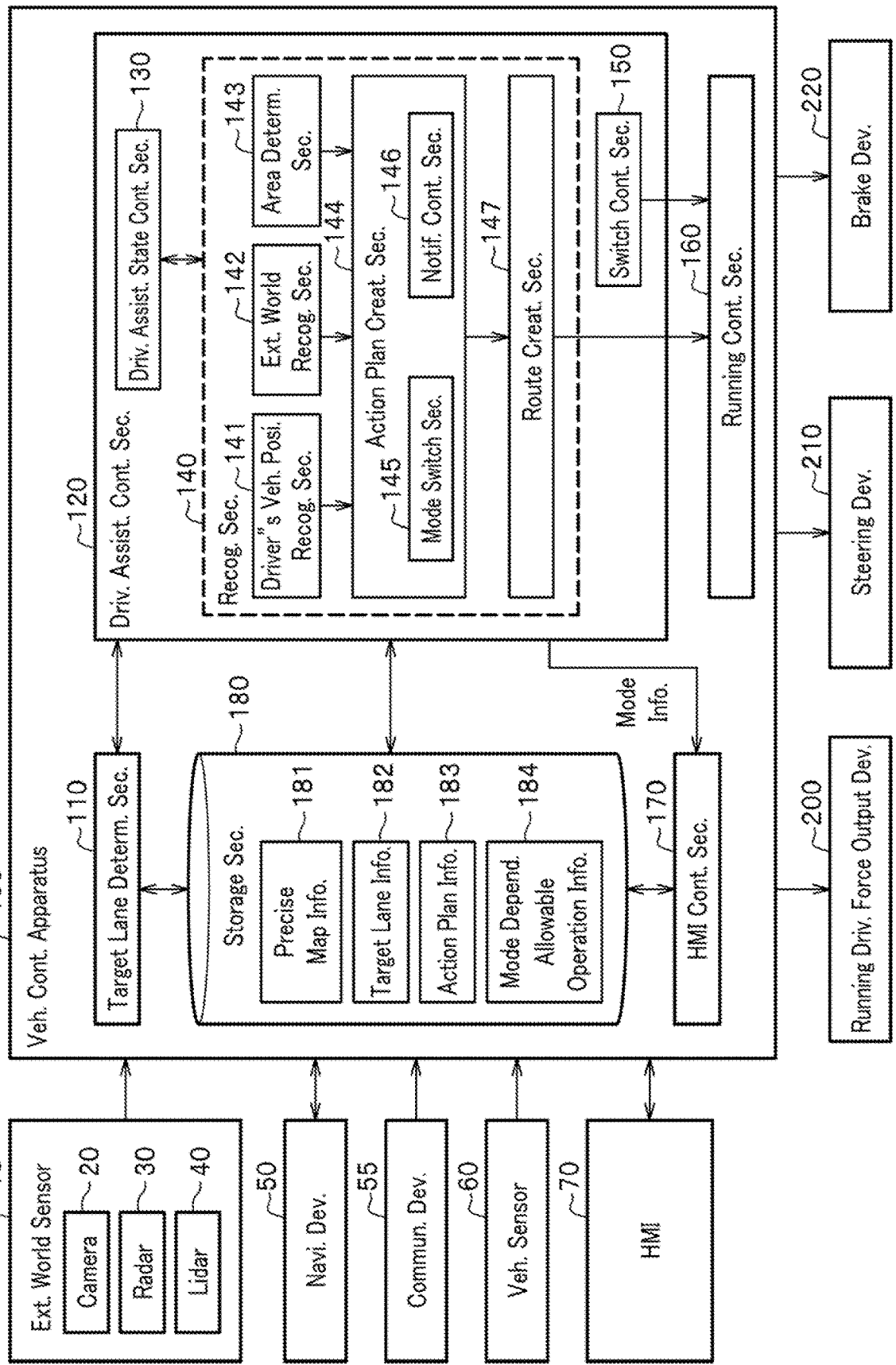
FIG. 2 shows a schematic configuration of the vehicle control apparatus of the embodiment of the present invention along with peripheral components of the vehicle control apparatus.

FIG. 2 shows a functional block diagram indicating the vehicle control apparatus 100 of this embodiment of the present invention along with its peripheral devices.

In addition to the external world sensor 10, the navigation device 50 and the vehicle control apparatus 100, a communication device 55, the vehicle sensor 60, HMI (Human Machine Interface) 70, a running driving force output device 200, a steering device 210 and a brake device 220 that are shown in FIG. 2 may be mounted on the driver's vehicle M. The communication device 55, the vehicle sensor 60, the HMI 70, a running driving force generating device 200, a steering device 210 and the brake device 220 are configured to communicate data individually with the vehicle control apparatus 100 through a communication medium.

Communication Device 55

The communication device 55 may perform a function of communicating through a cellular network, a Wi-Fi network, Bluetooth (registered trademark), DSRC (Dedicated Short-Range Communication), and the like through the wireless communication medium.

The communication device 55 may be configured to communicate wirelessly with an information providing server of a system to monitor a traffic status of a road such as VICS (Vehicle Information and Communication System) and receive traffic information indicating the traffic status of a road along which the driver's vehicle M is now running or is going to run. The traffic information includes traffic jam information on a road along which the driver's vehicle M is going to run and how long it takes to run through a section of a road in a traffic jam, information on an accident, a broken-down vehicle and a road construction, information on speed restriction and lane restriction, and information on where a parking area is and whether the parking area or a service area is fully occupied with vehicles or has empty spaces left for parking. The communication device 55 may receive the above-mentioned information by communicating with a wireless beacon installed on a side space of a road or communicating wirelessly with other vehicles running around the driver's vehicle M.

Vehicle Sensor 60

A vehicle sensor 60 includes a vehicle speed sensor to detect a vehicle speed of the driver's vehicle M, an acceleration sensor to detect an acceleration, a yaw rate sensor to detect an angle velocity about a vertical axis and an orientation sensor to detect an orientation of the driver's vehicle M.

Configuration of HMI 70

Next, HMI 70 is described with reference to FIG. 3.

Figure 3:
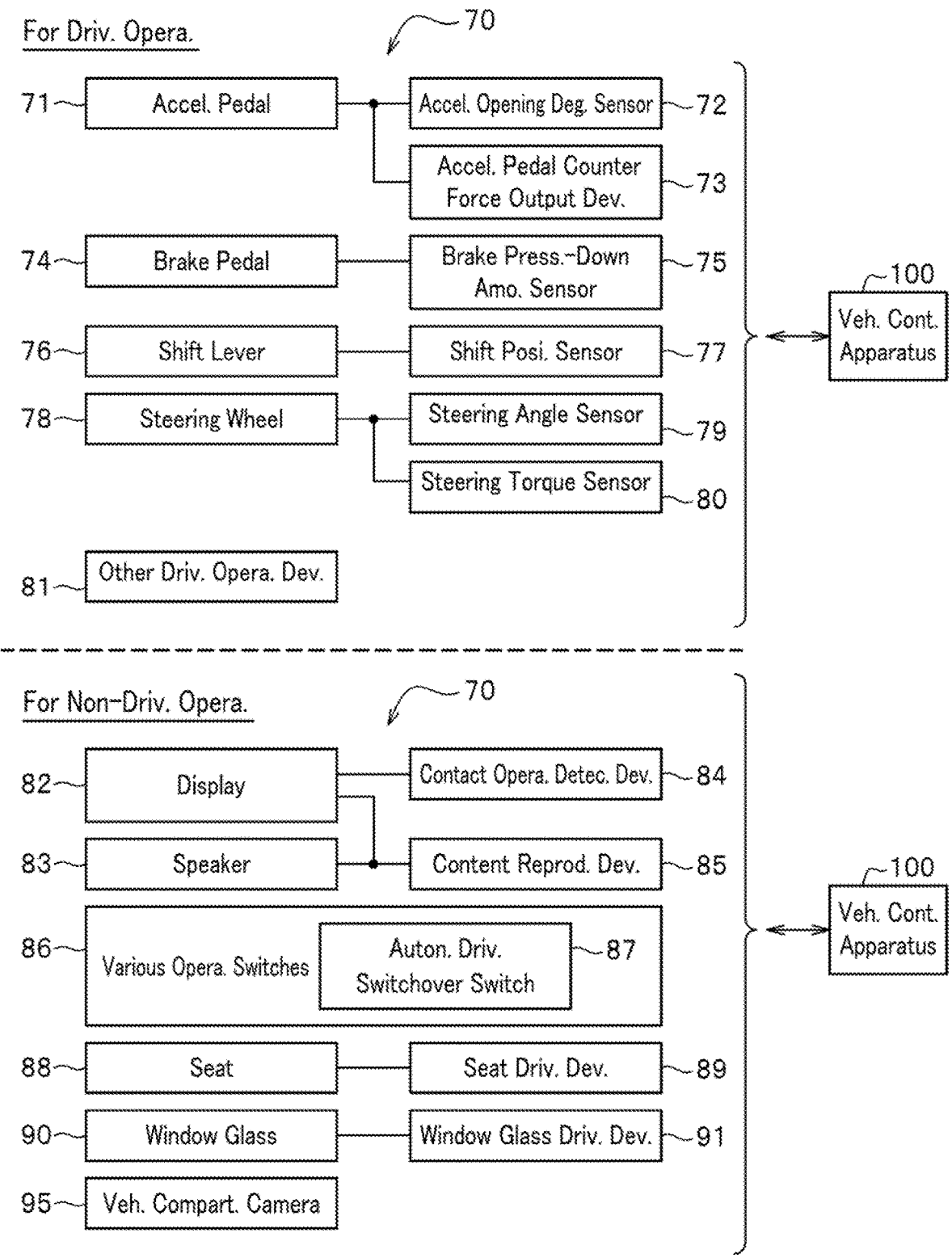
FIG. 3 shows a schematic configuration of HMI that is connected to the vehicle control apparatus of the embodiment of the present invention.

FIG. 3 shows a schematic configuration of HMI 70 connected with the vehicle control apparatus 100 of this embodiment of the present invention. The HMI 70 comprises components for driving operation and components for other operations than the driving operation, as shown in FIG. 3. However, separation between these is not distinctive and some component for the driving operation may have functions for a non-driving operation (or vice versa).

The HMI 70 comprises such components for driving operation as an acceleration pedal 71, an acceleration opening degree sensor 72, an acceleration pedal counter force output device 73, a brake pedal 74, a brake pressing-down amount sensor 75, a shift lever 76, a shift position sensor 77, a steering wheel 78, a steering angle sensor 79, a steering torque sensor 80 and other driving operation devices 81.

The acceleration pedal 71 is an accelerating operation element to be pressed down by a driver and to receive an instruction by the driver for acceleration (or to be released back by the driver and to receive an instruction by the driver for deceleration). The acceleration opening degree sensor 72 is configured to detect an amount by which the acceleration pedal 71 is pressed down and output an acceleration opening degree signal to the vehicle control apparatus 100.

Here, the acceleration opening degree signal may be directly outputted to the running driving force output device 200, the steering device 210, or the brake device 220 instead of being outputted to the vehicle control apparatus 100. Similarly, other output signals from the components for the driving operation may also be outputted to the vehicle control apparatus 100 or directly to the running driving force output device 200, the steering device 210, or the brake device 220 instead of being outputted to the vehicle control apparatus 100. The acceleration pedal counter force output device 73 is configured to output a force (operation counter force) that the acceleration pedal 71 applies in response to receiving an instruction from the vehicle control apparatus 100 and acts in an opposite direction to a direction in which the acceleration pedal 71 is pressed down, for instance.

The brake pedal 74 is a decelerating operation element to receive an instruction by a driver for deceleration. The brake pressing-down amount sensor 75 is configured to detect an amount by which a driver presses down the brake pedal 74 (or a force to be applied to the brake pedal 74 to press down the brake pedal 74) and output a detection signal corresponding to a detected result to the vehicle control apparatus 100.

The shift lever 76 is a shift operation element to receive an instruction by a driver for changing a shift position. The shift position sensor 77 is configured to detect a shift position to which a driver shifts the shift lever 76 and output a shift position signal indicating a detected result to the vehicle control apparatus 100.

The steering wheel 78 is a steering operation element to receive an instruction by a driver for steering the driver's vehicle M. The steering angle sensor 79 is configured to detect an operation angle of the steering wheel 78 and output a steering angle signal indicating a detected result to the vehicle control apparatus 100. The steering torque sensor 80 is configured to detect a torque applied to a steering shaft by the steering wheel 78 to be turned and output a steering torque signal indicating a detected result to the vehicle control apparatus 100. The steering wheel 78 corresponds to a "driving operation element" of the present invention.

The other driving operation devices 81 include, for example, a joystick, a button, a dial-switch, a GUI (Graphical User Interface). The other driving operation devices 81 are configured to receive instructions for acceleration, deceleration and turning, and output the instructions to the vehicle control apparatus 100.

The HMI 70 comprises such elements for non-driving operation as a display 82, a speaker 83, a contact operation detecting device 84, a content reproduction device 85, various operation switches 86, a seat 88, a seat driving device 89, window glass 90, a widow glass driving device 91, a window driving device 91 and a vehicle compartment camera 95.

The display 82 may be an LCD (Liquid Crystal Display) or an organic electroluminescence display to be attached to various portions of an instrument panel and any portion opposite to a passenger seat or a rear seat.

In addition, the display may be a HUD (Head Up Display) that projects an image on a front windshield or other window glass. The speaker 83 outputs voice.

The contact operation detecting device 84 is configured to detect a contact position (touch position) on a display image surface of the 82 and output it to the vehicle control apparatus 100 if the display 82 is a touch panel. If the display 82 is not a touch panel, the contact operation detecting device 84 is not needed.

The content reproduction device 85 may be, for example, a DVD (Digital Versatile Disc) player, a CD (Compact Disc) player, a television receiver, or an image creation device for various instructions. Each of the display 82, the speaker 83, the contact operation detecting device 84, and the content reproduction device 85 may be partially or entirely included in the navigation device 50.

Various switches 86 are installed at various positions in a vehicle compartment. The various switches 86 may include an autonomous driving switchover switch 87 to instruct that autonomous driving should start (or in a predetermined time) or stop. The autonomous driving switchover switch 87 may be a GUI (Graphical User Interface) switch or a mechanical switch. In addition, the various switches may include switches to drive the seat driving device 89 and the window driving device 91.

The seat 88 is a seat on which a passenger of the driver's vehicle M sits. The seat driving device 89 may be capable of driving the seat 88 to change freely a reclining angle, a front-rear direction position and a yaw angle. The window glass 90 is installed, for example, on each of the doors. The window driving device 91 is configured to drive the window glass to open and close.

The vehicle compartment camera 95 may be a digital camera utilizing such a solid imaging element as CCD or CMOS. The vehicle compartment camera 95 may be installed on a rear view mirror or a steering boss, or at such a position that the vehicle compartment camera 95 is able to take an image of at least a head portion of a driver who is performing driving operation. For instance, the vehicle compartment camera 95 may periodically and repeatedly take an image of an inside of the vehicle compartment inclusive of the driver.

Configuration of Vehicle Control Apparatus 100

Next, the configuration of the vehicle control apparatus 100 is described with reference again to FIG. 2.

The vehicle control apparatus 100 may be realized, for example, by one or more processors or hardware being capable of equivalently functioning. The vehicle control apparatus 100 may be a combination of a processor such as CPU (Central Processing Unit), a storage device, and ECU (Electronic Control Unit) that is connected with a communication interface through inside bus lines, or MPU (Micro-Processing Unit).

The vehicle control apparatus 100 may comprise a target lane determining section 110, a driving assistance control section 120, a running control section 160, an HMI control section 170, and a storage section 180.

Functions of the target lane determining section 110 and the driving assistance control section 120 and part or all of functions of the running control section 160 may be performed by a processor executing a program (software). Alternatively, part or all of these functions may be performed by LSI (Large Scale Integration) or ASIC (Application Specific Integrated Circuit), or a combination of hardware and software.

Hereinafter, when "xxx section" is referred to as a subject to perform a function, the driving assistance control section 120 reads a program from a memory such as ROM or EEPROM (Electrically Erasable Programmable Read-Only Memory), when needed, to load it on RAM to have the section perform its function (described later). The program for each section may be stored in the storage section 180 or may be stored in other storage medium and read through a communication medium into the vehicle control apparatus 100.

Target Lane Determining Section 110

The target lane determining section 110 may be implemented, for example, by MPU (Micro Processing Unit). The target lane determining section 110 may divide the route provided by the navigation device into plural sections (for example, divide the route every 100 m in the running direction of the driver's vehicle M) and determine a target lane in each section with reference to precise map information 181. The target lane determining section 110 may be configured to make a decision, for instance, of which one of the lanes numbered from the left-most lane in each section the driver's vehicle M should run on. For instance, if there is a junction ahead where a current road along which the driver's vehicle M is running branches into two roads or other road joins the current road, the target lane determining section 110 determines a reasonable target lane so that the driver's vehicle M can run through the junction to run on an intended road beyond the junction. The target lane determined by the target lane determining section 110 is stored as target lane information 182 in the storage section 180.

Driving Assistance Control Section 120

The driving assistance control section 120 may comprise a driving assistance state control section 130, a recognizing section 140 and a switch control section 150.

Driving Assistance State Control Section 130

The driving assistance state control section 130 may be configured to determine an autonomous driving mode (autonomous driving assistance state) that the driving assistance control section 120 performs based on an operation the driver performs on the HMI 70, an event that an action plan creating section 144 determines, a running mode determined by a route creating section 147, and the like. The autonomous driving mode is notified to the HMI control section 70.

No matter what autonomous driving mode the driver's vehicle M is in, it can be switched to (overridden by) a lower-level autonomous driving mode by performing an operation on a component of the HMI control section 70 for the driving operation.

This overriding occurs, if an operation performed by the driver on the driver's vehicle M on a component of the HMI control section 70 for the driving operation continues over a longer time than a predetermined time, if the operation gives rise to an operation amount larger than a predetermined operation change amount (for example, the acceleration opening degree of the acceleration pedal 71, the pressing-down amount of the brake pedal 74 and the steering angle of the steering wheel 78), or if the operation on the component for driving operation is performed more times than predetermined times.

Autonomous Driving Assistance State of an Embodiment of the Present Invention Next, the transition of an autonomous driving assistance state is described with reference to FIG. 4.

Figure 4:
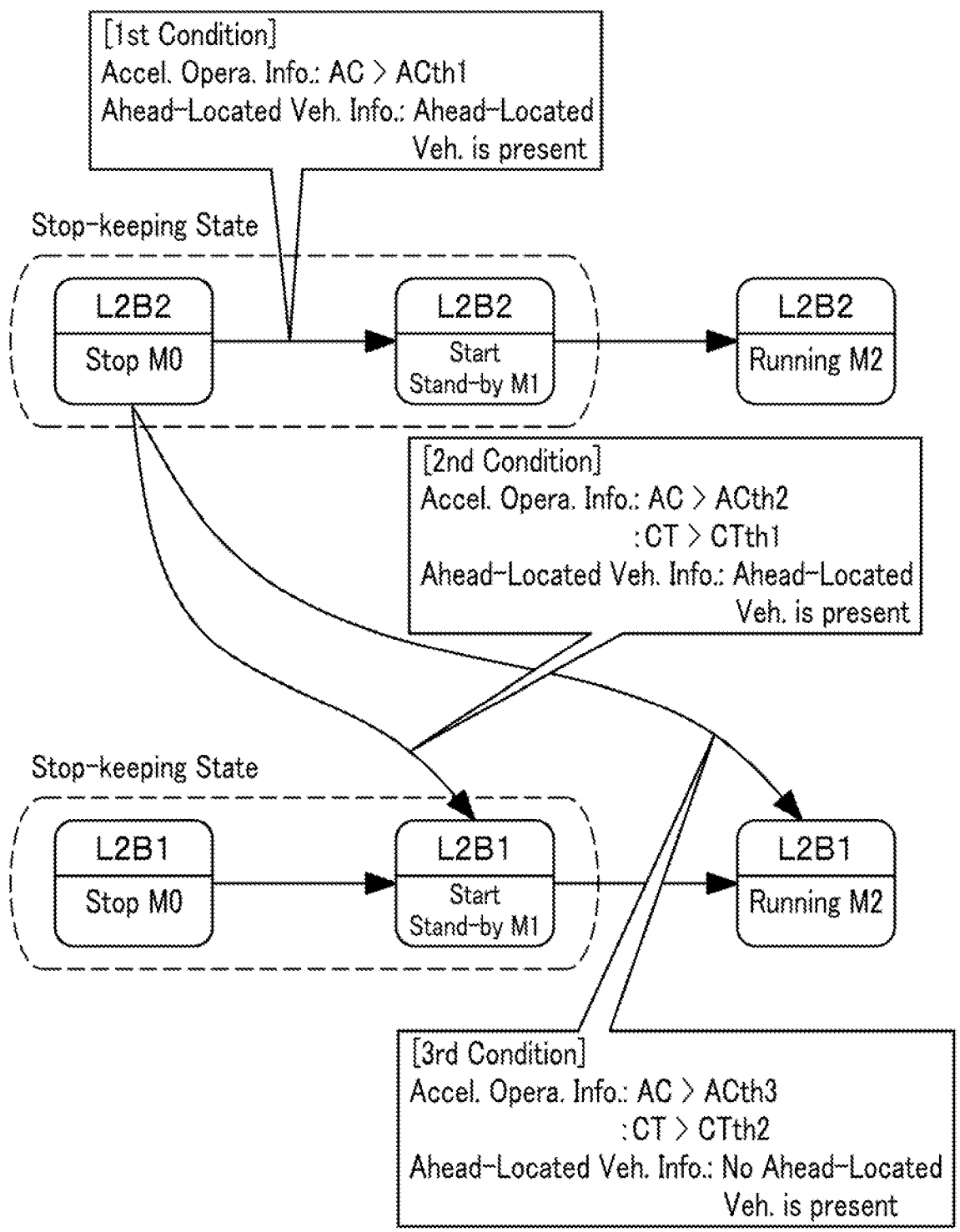
FIG. 4 indicates how a driving assistance state and an operation state of the vehicle are made to transition by the vehicle control apparatus of the embodiment of the present invention.

FIG. 4 indicates how the driving assistance state and the operation state of the driver's vehicle M are made to transition by the vehicle control apparatus 100 of the embodiment of the present invention.

The autonomous driving assistance states include the following states. These states are examples and the number and contents of the autonomous driving assistance states may be determined appropriately. In addition, the following names of levels of the autonomous driving assistance states are examples.

According to the international standard for autonomous driving, there is an autonomous driving level L2 where the system performs a driving assistance operation of continuously performing a restricted part of the acceleration and deceleration control operations and the steering control operation under the responsibility of a driver (who is responsible for a duty to supervise the system and monitor the surrounding around the driver's vehicle M).

According to the present invention, for instance, the autonomous driving level L2 has a first category (category B1 belonging to L2: L2B1) and a second category (category B2 belonging to L2: L2B2). The first category L2B1 requires an operation by a driver on a driving operation element to continue to have a predetermined driving assistance function performed (for instance, a hand-on state where the steering wheel 78 is held by a hand is required). The second category L2B2 does not require the operation by a driver on the driving operation element to continue to have the predetermined driving assistance function performed (allowing a hand-off state where the steering wheel is not held by a hand).

Each of the first category L2B1 and the second category L2B2 may be divided into three states of possible vehicle operation states, a stop state, a start-stand-by state and a running state. When the driver's vehicle M is in any of the stop state and the start-stand-by state, the driver's vehicle M is in a stop-keeping state. Then the stop state and the start-stand-by state may be collectively called a stop-keeping mode Since the operation on the driving operation element is not needed for the second category L2B2 to continue to have the predetermined driving assistance function performed, the driver requested tasks for the second category L2B2 are reduced, compared with the first category L2B1. Whether the driver is operating (inclusive of touching and gripping) the driving operation element or not, the second category L2B2 continues to allow the hand-off state.

However, when the operation by a driver on the driving operation element is inputted (for instance, steering operation is performed with the steering wheel 78) with the autonomous driving assistance state being the second category L2B2, overriding of the driving assistance control occurs and the autonomous driving assistance state transitions from the second category L2B2 to the first category L2B1.

The driver requested task means what a driver is requested to do. Particularly, the holding operation on the steering wheel that the driver is requested to perform corresponds, for instance, to a driver requested task. The state in which such a driving operation element as the steering wheel is operated by a driver is called a hand-on state. In addition, the state in which a driver's hand is kept off from the driving operation element is called a hand-off state.

The first category L2B1 belonging to the autonomous driving level L2 corresponds to a "first assistance state" in the present invention. The second category L2B2 belonging to the autonomous driving level L2 corresponds to a "second assistance state".

Recognizing Section 140

The recognizing section 140 may comprise a driver's vehicle position recognizing section 141, an external world recognizing section 142, an area determining section 143, an action plan creating section 144 and a route creating section 147.

Driver's Vehicle Position Recognizing Section 141

The driver's vehicle position recognizing section 141 may be configured to recognize a running lane on which the driver's vehicle M is running and a relative position of the driver's vehicle M in the running lane based on the precise map information 181 stored in the storage section 180 and information inputted from the camera 20, the radar 30, the lidar 40, the navigation device 50 and the vehicle sensor 60.

The driver's vehicle position recognizing section 141 recognizes the running lane of the driver's vehicle M by comparing a pattern of road partitioning lines recognized based on the precise map information 181 (for example, how solid lines and dashed lines are arranged) with a pattern of road partitioning lines around the driver's vehicle M that are recognized based on images taken by camera 20. When recognizing the running lane of the driver's vehicle M, the current position of the driver's vehicle M received from the navigation device 50 or a processed result by INS may be taken into consideration.

External World Recognizing Section 142

The external world recognizing section 142 may be configured to recognize a state of the external world including positions, vehicle speeds and accelerations of nearby vehicles based on external world information inputted from the external world sensor 10 including the camera 20, the radar 30 and the lidar 40, as shown in FIG. 2. Here, the nearby vehicle is, for example, a vehicle that is running around the driver's vehicle M and in the same direction as the driver's vehicle M.

The position of the nearby vehicle may be represented by such an exemplary point as a center of mass or a corner or by a region described by a profile of the nearby vehicle. The state of the nearby vehicle may include the acceleration of the nearby vehicle and whether the nearby vehicle is changing lanes (or trying to change running lanes) that are recognized based on information from the devices as above mentioned.

Furthermore, the external world recognizing section 142 may be configured to recognize positions of the indicative objects inclusive of a guard rail, a utility pole, a parking vehicle, a pedestrian, and a traffic sign in addition to the nearby vehicles.

In the embodiment of the present invention, a vehicle, which is one of the nearby vehicles that is running just ahead of the driver's vehicle M and is an object for the driver's vehicle M to follow under the follow-up running control, is called an "ahead-located vehicle".

Area Determining Section 143

The area determining section 143 is configured to determine a special area (IC/JCT/Lane increasing/Lane decreasing) in an area located ahead of the driver's vehicle M. The area determining section 143 may receive the special area from map information. Even when the driver's vehicle M cannot detect what are in the distance because of an ahead-located vehicle being in the way, the area determining section 143 can determine the special area in the distance based on information on the special area obtained from the map information.

For the sake of simplicity of the description, the area determining section 143 is specified as a separate component from the camera 20 and the external world recognizing section 142. However, the area determining section 143 is may be any element that is capable of determining a special indicative object and may be an image processing section to extract a person and the like out of an image taken by the camera 20, or the external world recognizing section 142 that can perform the function of the area determining section 143 by performing an internal processing on a profile in the image to recognize and detect a person and the like. In this case, the area determining section 143 is omitted from the recognizing section 140 in FIG. 2.

In addition, as described later, the special area determined by the area determining section 143 may be checked by making use of VICS information received by the communication device 55 to increase a determining probability of the special area.

Action Plan Creating Section 144

The action plan creating section 144 is configured to set a start point of the autonomous driving and/or a destination of the autonomous driving. The start point of the autonomous driving may be a current position or a point at which the operation of the autonomous driving that is instructed starts. The action plan creating section 144 is configured to create an action plan for the road sections between the start point and the destination of the autonomous driving. In addition, the action plan creating section 144 may create an action plan for any road section as well.

The action plan is constituted by, for instance, various events that are to be performed in a sequential order. The various events include, for example, a deceleration event to decelerate the driver's vehicle M, an acceleration event to accelerate the driver's vehicle M, a lane keeping event to have the driver's vehicle M keep on running in a running lane without deviating from the running lane, a lane change event to change running lanes, an overtaking event to have the driver's vehicle overtake an ahead-located vehicle running ahead of the driver's vehicle M, a branching point event to have the driver's vehicle M change running lanes to a lane the driver wants to take or keep on running on the current lane without deviating from the current lane, a joining point event to have the driver's vehicle accelerate or decelerate to change running lanes to join a main running lane from a joining lane, a hand-over event to switch from the manual driving mode to the autonomous driving mode at the start point of the autonomous driving or switch from the autonomous driving mode to the manual driving mode at the end point of the autonomous driving.

The action plan creating section 144 schedules the lane change event, the branching point event or the joining point event at a position where the target lane determined that the target lane determining section 110 determines is changed to another lane. Information on the action plan created by the action plan creating section 144 is stored in the storage section 180 as action plan information 183.

The action plan creating section 144 comprises a mode switch section 145 and a notification control section 146.

Mode Switch Section 145

The mode switch section 145 may be configured to have the driver's vehicle in operation either in the first assistance state L2B1 to require the hand-on state with the steering wheel 78 held by a driver's hand, or in the second assistance state L2B2 to allow the hand-off state in which a driver's hand is kept off from the steering wheel 78. Each of the first assistance state L2B1 and the second assistance state L2B2 is a driving assistance state that requires a driver at least monitoring the surrounding and the system as a driver requested task.

Notification Control Section 146

The notification control section 146 may be configured to have a speaker 83 output to a driver on the driver's vehicle M voice information that the driving assistance state of the driver's vehicle M has transitioned to the first assistance state L2B1, when the mode switch section 145 switches the driving assistance state from the second assistance state L2B2 to the first assistance state L2B1. The notification control section 146 may have the speaker 83 output voice information that is stored in the storage section 180 in advance. For example, when a level of the driving assistance state is switched from the second assistance state L2B2 down to the first assistance state L2B1, such voice information as "Transition to the first assistance state is occurring. Please hold the steering wheel." may be used.

The voice information is not limited to this voice message, which is just an example. As long as it is possible to notify the driver on the driver's vehicle M of the transition of the driving assistance state, other sound or voice may be used. Alternatively, this notification may be performed with other means than voice, such as light emission, indication on a display, vibration, or a combination of these.

Route Creating Section 147

The route creating section 147 may be configured to create a route for the driver's vehicle M to run along based on the action plan created by the action plan creating section 144.

Switch Control Section 150

A switch control section 150 may be configured to switch between the manual driving mode and the autonomous driving mode, based on a signal inputted from the autonomous driving switchover switch 87 (See FIG. 3) or the like, as shown in FIG. 2. In addition, the switch control section 150 may switch the current autonomous driving mode to a lower level driving mode based on an operation on a component of the HMI 70 for the driving operation for acceleration, deceleration, or steering. For instance, the switch control section 150 may switch the current autonomous driving mode to a lower level driving mode (overriding) when a state in which an operation amount indicated by a signal inputted from the component for driving operation of HMI 70 is over a threshold amount continues for a longer time than a predetermined time. The switch control section 150 may switch the autonomous driving mode back to the previous autonomous driving mode if no operation on the component of HMI 70 for driving operation is detected for a predetermined time after the autonomous driving mode is switched to the lower level driving mode.

Running Control Section 160

A running control section 160 may be configured to control the running driving force output device 200, the steering device 210 and the brake device 220 in such a way that the driver's vehicle M runs through the route that the route creating section 147 has created on time as scheduled.

HMI Control Section 170

An HMI control section 170 may be configured to control HMI 70 in accordance with a kind of the autonomous driving mode with reference to mode dependent allowable operation information 184 (described later, See FIG. 1) when receiving information on the autonomous driving mode from the driving assistance control section 120.

The HMI control section 170 may determine those devices that are allowed to be used (navigation device 50 and part or all of HMI 70) and those devices that are not allowed to be used with reference to the mode dependent allowable operation information 184 based on the information on the autonomous driving mode received from the driving assistance control section 120. In addition, the HMI control section 170 may determine whether an operation by the driver on a component of the HMI 70 for the non-driving operation or on the navigation device 50 should be enabled or not, based on the determination result.

For instance, when the vehicle control apparatus 100 is performing the manual driving mode, the driver can operate components of HMI 70 for the driving operation (for example, acceleration pedal 71, brake pedal 74, shift lever 76 and steering wheel 78, See FIG. 3).

When the driving assistance state in which the vehicle control apparatus 100 operates transitions from the second assistance state L2B2 to the first assistance state L2B1 as shown in FIG. 4, the driver has to perform a hand-on duty on the steering wheel 78. If the driver does not perform the hand-on duty, the driver's vehicle is prevented from running normally.

Then, the HMI control section 170 may notify and warn the driver of the hand-on duty on the steering wheel 78 being applied to the driver, a predetermined time before the driving assistance state of the driver's vehicle M transitions from the second assistance state (L2B2) to the first assistance state (L2B1) or before a running speed of the driver's vehicle M becomes a predetermined speed. As a result, a preparation time for the autonomous driving mode being switched is provided to the driver.

Storage Section 180

The storage section 180 may store, for example, precise map information 181, target lane information 182, action plan information 183, mode dependent allowable operation information 184 and the like. The storage section 180 may be ROM (Read Only Memory), RAM (Random Access Memory, HDD (Hard Disk Drive), a flash memory, or the like. A program to be executed by a processor may be stored in the storage section 180 in advance or downloaded from an external device through an internet device mounted on the driver's vehicle M. Alternatively, the program is stored in a portable storage medium and installed into the storage section 180 after the portable storage medium is connected with a drive device (not shown).

The precise map information 181 may include more precise map information than navigation map installed in the navigation device 50. The precise map information 181 may include, for example, information on a center portion of a lane or a boundary of the lane. The boundary of the lane includes a kind, a color and a length of a lane mark, a width of a lane, a road width, a width of a road shoulder, a width of a main lane, a width of a running lane, a position of the boundary, a kind of the boundary (guard rail, softscape, kerbstone), a zebra pattern zone for guiding and the like, and these boundaries are included in the precise map.

In addition, the precise map information 181 may include road information, traffic restriction information, address information (address/post code), facility information and telephone number information. The road information includes information representing a kind of a road such as an expressway, a toll road, a national road and a prefectural road, a number of lanes, a width of each lane, a slope of a road, a position of a road (three dimensional coordinates including a longitude, a latitude and an altitude), a curvature of a curve of a road, a position of a junction of lanes, road sign installed along a road and the like. The traffic restriction information includes information on a road being blocked by a construction, a traffic accident, a traffic jam, or the like.

Running Driving Force Generating Apparatus 200, Steering Device 210, Brake Device 220

The vehicle control apparatus 100 may be configured to control the running driving force generating apparatus 200, the steering device 210 and the brake device 220 in accordance with a running control instruction from the running control section 160, as shown in FIG. 2.

Running Driving Force Generating Apparatus 200

The running driving force output device 200 is configured to output a running driving force (torque) to drive wheels. The running driving force output device 200 may include, for example, an engine (not shown), a transmission (not shown) and an engine ECU (Electronic Control Unit, not shown) to control the engine, if the driver's vehicle M is an automotive vehicle having a driving force source of an internal combustion engine. Alternatively, the running driving force output device 200 may include a driving motor (not shown) and a motor ECU to control the motor (not shown), if the driver's vehicle M is an electric vehicle having a driving force source of an electric motor. Alternatively, the running driving force output device 200 may include an engine, a transmission, an engine ECU, a driving motor and a motor ECU (all of these are not shown), if the driver's vehicle M is a hybrid vehicle.

If the running driving force output device 200 includes only an engine, the engine ECU is configured to control a throttle opening degree of the engine, a shift level and the like in accordance with information received from the running control section 160 described later. If the running driving force output device 200 includes only the driving motor, the motor ECU is configured to control a duty ratio of a PWM signal to be applied to the driving motor in accordance with the information received from the running control section 160.

If the running driving force output device 200 includes both the engine and the driving motor, the engine ECU and the motor ECU work in cooperation with each other to control the running driving force in accordance with the information received from the running control section 160.

Steering Device 210

The steering device 210 may include, for example, a steering ECU and an electrical motor (these are not shown). The electrical motor is configured to turn wheels to be steered to change a direction of the wheels by applying a force to a rack-and-pinion mechanism.

The steering ECU is configured to drive the electrical motor for changing the direction of the wheels in accordance with information inputted by the vehicle control apparatus 100 or inputted information on an steering angle or a steering torque.

Brake Device 220

The brake device 220 may be an electrically driving servo brake device including, for example, a brake caliper, a brake cylinder to apply a hydraulic pressure to the brake caliper, an electrical motor to generate the hydraulic pressure in the cylinder, and a braking control section (all of these are not shown). The braking control section of the electrically driving servo brake device is configured to control the electrical motor in accordance with the information inputted from the running control section 160 so that a brake force that is commensurate with a braking operation is applied to each wheel. In addition, the electrically driving servo brake device may include a mechanism to transmit a hydraulic pressure generated by an operation on a brake pedal to the brake cylinder through a master cylinder as a back-up system.

The brake device 220 is not limited to the electrically driving servo brake device as above described and may be an electrically controlled hydraulic pressure brake device. The electrically controlled hydraulic pressure brake device is configured to control an actuator in accordance with the information inputted from the running control section 160 to transmit a hydraulic pressure in the master cylinder to brake cylinders. In addition, the brake device 220 may include a regenerative brake system with the driving motor that may be included in the running driving force output device 200.

Operation of Vehicle Control Apparatus 100

Next, how the vehicle control apparatus 100 as configured above described operates is described with reference to FIG. 4.

How the System Operates when Information that a Driver has Performed an Accelerating Operation Suppose that information that a driver has performed an accelerating operation is received when the driver's vehicle M is in a stop state M0 and performing follow-up running control with its driving assistance state being the second assistance state L2B2, that is, the hand-off state.

There are, for instance, three types of system operations this driver's vehicle M can take as follows.

First Type of System Operation

The driving assistance control section 120 installed in the vehicle control apparatus 100 according to the present invention has the operation state of the driver's vehicle M being in the stop-keeping mode transition from the stop state M0 to the start-stand-by state M1 keeping the driving assistance state of the driver's vehicle M at the second assistance state L2B2, as indicated in FIG. 4, if the driving assistance control section 120 receives not only accelerating operation information that an accelerating operation AC that exceeds a predetermined first threshold acceleration ACth1 but also ahead-located vehicle information that there is an ahead-located vehicle ahead of the driver's vehicle M, as shown in FIG. 4. This operation is called a first type of system operation, and a condition to cause the first type of system operation is a first condition.

In this way, the driver's vehicle M that is performing the follow-up running control is ready to start to follow up the ahead-located vehicle as soon as it receives ahead-located vehicle information that the ahead-located vehicle has started.

The reason why driving assistance control section 120 has to receive the accelerating operation information that an accelerating operation AC that exceeds a predetermined first threshold acceleration ACth1 in this operation is that the driving assistance control section 120 checks that the driver has an intention to start the driver's vehicle M. Since there is an ahead-located vehicle, the driver's vehicle M is prevented from starting unless the ahead-located vehicle starts.

The predetermined first threshold acceleration ACth1 is set to an appropriate acceleration based on which it can be checked that the driver has the intention to start the driver's vehicle M.

As described, according to the embodiment of the present invention, if the driving assistance control section 120 receives the accelerating operation information that an accelerating operation AC that exceeds a predetermined first threshold acceleration ACth1 with the operation state of the driver's vehicle M being the stop state M0, the driving assistance control section 120 determines that there is an obstacle (ahead-located vehicle) for starting the driver's vehicle M though the driver has an intention to start and makes the driver's vehicle M into the start-stand-by state. As a result, the driver's vehicle M is able to start in accordance with the driver's intention and follow up the ahead-located vehicle as soon as the ahead-located vehicle information that the ahead-located vehicle has started is received.

According to the first type of the system operation, if the driver performs an accelerating operation when the follow-up running control is being performed with the operation state of the driver's vehicle M being the stop state M0 and with the driving assistance state of the driver's vehicle M being the second assistance state L2B2, that is, the hand-off state, the driver's vehicle M can start to follow up the ahead-located vehicle as soon as receiving the ahead-located vehicle information that the ahead-located vehicle has started, keeping the hand-off state.

Second Type of System Operation

The driving assistance control section 120 installed in the vehicle control apparatus 100 according to the present invention has the driving assistance state of the driver's vehicle M transition from the second assistance state L2B2 to the first assistance state L2B1 and has the operation state of the driver's vehicle M in the first assistance state L2B1 transition from the stop state M0 to the start-stand-by state M1, as indicated in FIG. 4, if the driving assistance control section 120 receives not only the accelerating operation information that the driver has performed the accelerating operation AC that exceeds a predetermined second threshold acceleration ACth2 over a longer time than a predetermined first threshold duration CTth1 but also the ahead-located vehicle information that there is an ahead-located vehicle. This operation is called a second type of system operation, and a condition to cause the second type of system operation is called a second condition.

In this way, the driver's vehicle M that is in the hand-on state and is performing the follow-up running control is ready to start to follow up the ahead-located vehicle as soon as it receives ahead-located vehicle information that the ahead-located has started.

Here, the reason why the driving assistance control section 120 has to receive the accelerating operation information that the driver has performed the accelerating operation AC that exceeds the second threshold acceleration ACth2 over a longer time than a predetermined first threshold duration CTth1 is that the driving assistance control section 120 checks more unambiguously than in the first type of the system operation that the driver has the intention to starts the driver's vehicle M. Since there is an ahead-located vehicle, the driver's vehicle M is prevented from starting unless the ahead-located vehicle starts.

The predetermined second threshold acceleration ACth2 (ACth2≥ACth1) and the predetermined first threshold duration CTth1 are set to appropriate values based on which driver's intention to start is unambiguously checked.

According to the embodiment of the present invention, if the driving assistance control section 120 receives the accelerating operation information that the driver has performed the accelerating operation AC that exceeds the predetermined second threshold acceleration ACth2 over a longer time than the predetermined first threshold duration CTth1 when the driver's vehicle M is in the stop state M0, the driving assistance control section 120 determines that there is an obstacle (ahead-located vehicle present) for starting the driver's vehicle M although the driver has an unambiguous intention to start and makes the driver's vehicle M into the start-stand-by state. In this way, the driver's vehicle M is able to start in accordance with the driver's unambiguous intention to start and follow up the ahead-located vehicle as soon as the ahead-located vehicle information that the ahead-located vehicle has started is received.

According to the second type of system operation, if the driver performs the accelerating operation when the driver's vehicle M that is in the stop state M0 is performing the follow-up running control with the driving assistance state being the second assistance state L2B2, that is, the hand-off state, the driving assistance state of the driver's vehicle M is made to transition to the hand-on state from the hand-off state and the driver's vehicle can start to follow up the ahead-located vehicle as soon as receiving the ahead-located vehicle information that the ahead-located vehicle has started.

Third Type of System Operation

The driving assistance control section 120 installed in the vehicle control apparatus 100 according to the present invention has the driving assistance state of the driver's vehicle M transition from the second assistance state L2B2 to the first assistance state L2B1 and has the operation state of the driver's vehicle M in the first assistance state L2B1 transition from the stop state M0 to the running state M2 skipping the start-stand-by state M1, if the driving assistance control section 120 receives not only the accelerating operation information that the driver has performed the accelerating operation AC that exceeds a predetermined third threshold acceleration ACth3 over a longer time than a predetermined second threshold duration CTth2 but also the ahead-located vehicle information that there is no ahead-located vehicle. This operation is called a third type of system operation, and a condition to cause the third type of system operation is called a third condition.

In this way, the driver's vehicle M that is in the hand-on state and is performing the follow-up running control is ready to start performing constant speed running control at a predetermined vehicle speed without any obstacle (because there is no ahead-located vehicle) being in the way of the driver's vehicle M running ahead.

Here, the reason why the driving assistance control section 120 has to receive the accelerating operation information that the driver has performed the accelerating operation AC that exceeds the predetermined third threshold acceleration ACth3 over a longer time than the predetermined second threshold duration CTth2 is that the driving assistance control section 120 checks more unambiguously than in the first type of the system operation that the driver has the intention to start the driver's vehicle M to run. In this case, there is no ahead-located vehicle and thus there is no obstacle for the driver's vehicle M to start to run.

The predetermined third threshold acceleration ACth3 (ACth3≥ACth2≥ACth1) and the predetermined second threshold duration CTth2 (CTth2≥CTth1) are set to appropriate values based on which driver's intention to start is unambiguously checked.

According to the embodiment of the present invention, if the driving assistance control section 120 receives not only the accelerating operation information that the driver has performed the accelerating operation AC that exceeds the predetermined third threshold acceleration ACth3 over a longer time than the predetermined second threshold duration CTth2 but also the ahead-located vehicle information that there is no ahead-located vehicle when the driver's vehicle M is in the stop state (M0), the driving assistance control section 120 determines that there is no obstacle (no ahead-located vehicle) for starting the driver's vehicle M and that the driver has an unambiguous intention to start and has the driver's vehicle M start to run. In this way, the driver's vehicle M can start to run in accordance with driver's unambiguous intention after checking that there is no ahead-located vehicle.

According to the third type of system operation, if the driver performs an accelerating operation when the driver's vehicle M that is in the stop state M0 is performing the follow-up running control with the driving assistance state being the second assistance state L2B2, that is, the hand-off state, the driving assistance state of the driver's vehicle M is made to transition to the hand-on state from the hand-off state and the driver's vehicle M can be made to start to run in accordance with driver's unambiguous intention after checking that there is no ahead-located vehicle.

Action and Effect of Vehicle Control Apparatus 100 of an Embodiment of the Present Invention Next, actions and effects of the vehicle control apparatus 100 of an embodiment of the present invention is described.

A first aspect of the present invention provides a vehicle control apparatus 100 comprising a processor that comprises an driving assistance control section (information receiving section) 120 receiving individually external world information inclusive of information on an indicative object that is ahead of a driver's vehicle M in a running direction, accelerating operation information on an accelerating operation on the driver's vehicle M, vehicle speed information on a vehicle speed of the driver's vehicle M and ahead-located vehicle information on an ahead-located vehicle that is an object for the driver's vehicle M to follow up inclusive of information on a vehicle speed of the ahead-located vehicle, the driving assistance control section (determining section) 120 determining the ahead-located vehicle to be the object to follow up from the external world information that is received, a running control section 160 performing running control of the driver's vehicle M inclusive of follow-up running control after the ahead-located vehicle determined by the driving assistance control section (determining section) 120 within a speed range from a stop to a predetermined vehicle speed; and the driving assistance control section 120 performing a driving assistance operation using one of plural driving assistance states for assisting in driving the driver's vehicle M.

The plural driving assistance states include a first assistance state (L2B1) that requires an operation on a predetermined driving operation element for keeping a predetermined driving assistance function enabled (for instance, requesting a driver to hold a steering wheel 78 (hand-on state)) and a second assistance state (L2B1) that does not require the operation on the predetermined driving operation element for keeping the predetermined driving assistance function enabled (for instance, allowing the driver to have his or her hands off the steering wheel 78 (hand-off state)), wherein the second assistance state (L2B2) requires less driver requested tasks than the first assistance state (L2B1), and wherein any of a stop state (M0), a start-stand-by state (M1), and a running state (M2) is set as an operation state of the driver's vehicle M in each of the first and second assistance states.

When the running control section 160 is performing the follow-up running control with the driving assistance state of the driver's vehicle M being the second assistance state (L2B2) and with the operation state of the driver's vehicle M being the stop state (M0), the driving assistance control section 120 has the operation state of the driver's vehicle M transition from the stop state (M0) to the start-stand-by state (M1) with the driving assistance state of the driver's vehicle M kept at the second assistance state (L2B2), if the driving assistance control section (information receiving section) 120 receives the accelerating operation information that an accelerating operation that is larger than a predetermined first threshold acceleration ACth1 is performed and the ahead-located vehicle information that there is the ahead-located vehicle, and the driving assistance control section 120 has the driving assistance state of the driver's vehicle M transition from the second assistance state (L2B2) to the first assistance state (L2B1) and has the operation state of the driver's vehicle M in the first assistance state (L2B1) transition from the stop state (M0) to the start-stand-by state (M1), if the driving assistance control section (information receiving section) 120 receives the accelerating operation information that an accelerating operation that is larger than a predetermined second threshold acceleration ACth2 is performed over a longer time than a predetermined first threshold duration CTth1 and the ahead-located vehicle information that there is the ahead-located vehicle.

According to the vehicle control apparatus 100 of the first aspect, when the running control section 160 is performing the follow-up running control with the driving assistance state of the driver's vehicle M being the second assistance state (L2B2, hand-off state) and with the operation state of the driver's vehicle M being the stop state (M0), the driving assistance control section 120 has the operation state of the driver's vehicle M transition from the stop state (M0) to the start-stand-by state (M1) while keeping the driving assistance state of the driver's vehicle M at the second assistance state (L2B2), if the driving assistance control section (information receiving section) 120 receives the accelerating operation information that an accelerating operation that is larger than a predetermined first threshold acceleration ACth1 is performed and the ahead-located vehicle information that there is an ahead-located vehicle, and, on the other hand, the driving assistance control section 120 has the driving assistance state of the driver's vehicle M transition from the second assistance state (L2B2) to the first assistance state (L2B1) and has the operation state of the driver's vehicle M in the first assistance state (L2B1) transition from the stop state to (M0) to the start-stand-by state (M1), if the driving assistance control section (information receiving section) 120 receives the accelerating operation information that an accelerating operation that is larger than a predetermined second threshold acceleration ACth2 is performed over a longer time than a predetermined first threshold duration CTth1 and the ahead-located vehicle information that there is an ahead-located vehicle.

According to the vehicle control apparatus 100 of the first aspect, if a driver performs an accelerating operation when the follow-up running control is being performed with the driving assistant state of the driver's vehicle M being the second assistance state (L2B2, hand-off state), the driver's vehicle M can start to follow the ahead-located vehicle after receiving the ahead-located vehicle information that the ahead-located vehicle has started.

In addition, the driving assistance state of the driver's vehicle M may be made to transition from the hand-off state to the hand-on state and then the driver's vehicle M can start to follow the ahead-located vehicle after receiving the ahead-located vehicle information that the ahead-located vehicle has started.

Thus, according to the vehicle control apparatus 100 of the first aspect, if a driver performs an accelerating operation when the follow-up running control is being performed with the driving assistance state of the driver's vehicle M being the second assistance state (L2B2, hand-off state) and with the operation state of the driver's vehicle M being the stop state (M0), there are plural possible types of system operation modes that can be used and between which the operation is switched, which results in increasing the degrees of freedom for the system.

The vehicle control apparatus 100 of a second aspect has many parts in common with the vehicle control apparatus 100 of the first aspect. Therefore, only a different part of the vehicle control apparatus 100 of the second aspect from the first aspect is described.

The vehicle control apparatus 100 of the second aspect differs from the vehicle control apparatus 100 of the first aspect in that the driving assistance control section 120 of the second aspect has the driving assistance state of the driver's vehicle transition from the second assistance state (L2B2) to the first assistance state (L2B1) and has the operation state of the driver's vehicle in the first assistance state (L2B1) transition from the stop state (M0) to the running state (M2), if the driving assistance control section (information receiving section) 120 receives the accelerating operation information that the accelerating operation information that an accelerating operation that is larger than a predetermined third threshold acceleration ACth3 is performed over a longer time than a predetermined second threshold duration CTth2 and the ahead-located vehicle information that there is no ahead-located vehicle when the running control section 160 is performing the follow-up running control with the driving assistance state of the driver's vehicle M being the second assistance state (L2B2) and with the operation state of the driver's vehicle M being the stop state (M0).

The vehicle control apparatus 100 of the second aspect may include the driving assistance control section 120 to have the driving assistance state of the driver's vehicle M transition from the second assistance state (L2B2) to the first assistance state (L2B1) and have the operation state of the driver's vehicle M in the first assistance state (L2B1) transition from the stop state (M0) directly to the running state (M2), if the driving assistance control section (information receiving section) 120 receives the accelerating operation information that an accelerating operation that is larger than a predetermined third threshold acceleration ACth3 is performed over a longer time than a predetermined second threshold duration CTth2 and the ahead-located vehicle information that there is no ahead-located vehicle, when the running control section 160 is performing the follow-up running control with the driving assistance state of the driver's vehicle M being the second assistance state (L2B2) and with the operation state of the driver's vehicle M being the stop state (M0).

According to the vehicle control apparatus 100 of the second aspect, the driving assistance control section 120 may have the driving assistance state of the driver's vehicle M transition from the hand-off state to the hand-on state and has the driver's vehicle M start to run in accordance with driver's unambiguous intention to start after checking that there is no ahead-located vehicle, even if a driver has performed an accelerating operation when the running control section 160 is performing the follow-up running control with the driving assistance state of the driver's vehicle M being the second assistance state (L2B2, hand-off state) and with the operation state of the driver's vehicle M being the stop state (M0).

Therefore, according to the vehicle control apparatus 100 of the second aspect, there are plural possible types of operations that can be used and between which the operation modes of the driver's vehicle M is switched, if the driver performs an accelerating operation when the running control section 160 is performing the follow-up running control with the driving assistance state of the driver's vehicle M being the second assistance state (L2B2, hand-off state) and with the operation state of the driver's vehicle M being the stop state (M0), which is the same situation as the vehicle control apparatus 100 of the first aspect operates. Thus, the degrees of freedom for the system are increased.

The vehicle control apparatus 100 of a third aspect is in accordance with the vehicle control apparatus 100 of the first aspect or the second aspect and the driving assistance control section 120 of this vehicle control apparatus 100 may be configured to change the predetermined threshold acceleration ACth to a higher acceleration, if the driving assistance control section (information receiving section) 120 receives a vehicle speed information that a vehicle speed of the driver's vehicle M exceeds a predetermined threshold vehicle speed Vth when the follow-up running control is being performing with the driving assistance state of the driver's vehicle M being the second assistance state (L2B2) and with the operation state of the driver's vehicle M being the running state (M2).

According to the vehicle control apparatus 100 of the third aspect, the driving assistance control section 120 changes the predetermined threshold acceleration ACth to a higher acceleration, if the driving assistance control section (information receiving section) 120 receives a vehicle speed information that a vehicle speed of the driver's vehicle M exceeds a predetermined threshold vehicle speed Vth when the follow-up running control is being performing with the driving assistance state of the driver's vehicle M being the second assistance state (L2B2, hand-off state) and with the operation state of the driver's vehicle M being the running state (M2).

In short, the driving assistance control section 120 is configured to change the predetermined threshold acceleration ACth, which is used to check that the driver has an intention to start the driver's vehicle M to run, to a higher acceleration if a vehicle speed of the driver's vehicle M exceeds a predetermined threshold vehicle speed Vth. As a result, when the vehicle speed of the driver's vehicle M is higher than the predetermined threshold vehicle speed Vth, the driving assistance control section 120 determines that the driver has an intention to start the driver's vehicle M to run if an accelerating operation, which is larger than one operated when the vehicle speed of the driver's vehicle M is equal to or lower than the predetermined threshold vehicle speed Vth, is performed.

The vehicle control apparatus 100 of the third aspect may have a configuration in which the higher the vehicle speed of the driver's vehicle M is than the predetermined threshold vehicle speed Vth, the higher acceleration the predetermined threshold acceleration ACth is changed to, which is used for checking that the driver has the intention to start the driver's vehicle M to run.

According to the vehicle control apparatus 100 of the third aspect, when the vehicle speed of the driver's vehicle M becomes higher than the predetermined vehicle speed Vth, the predetermined threshold acceleration ACth is changed to a higher acceleration. As a result, for instance, the timing when the driving assistance state of the driver's vehicle M transitions from the second assistance state (L2B2) to the first assistance state (L2B1) can be appropriately varied and controlled based on how high the vehicle speed of the driver's vehicle M is.

The vehicle control apparatus 100 of a fourth aspect is in accordance with the vehicle control 100 of the first aspect or the second aspect and the driving assistance control section 120 of this vehicle control apparatus 100 may be configured to have the operation state of the driver's vehicle M in the second assistance state (L2B2) transition from the start-stand-by state (M1) to the running state (M2) and the running control section 160 starts the driver's vehicle M to follow the ahead-located vehicle after the operation state of the driver's vehicle M transitions to the running state (M2), if the driving assistance control section (information receiving section) 120 receives the ahead-located vehicle information that the ahead-located vehicle has started when the running control section 160 is performing the follow-up running control with the driving assistance state of the driver's vehicle M being the second assistance state (L2B2) and with the operation state of the driver's vehicle M being the start-stand-by state (M1).

The vehicle control apparatus 100 of the fourth aspect is ready to start the driver's vehicle M to follow the ahead-located vehicle as soon as the ahead-located vehicle starts, because the driving assistance control section 120 has the operation state of the driver's vehicle M in the second assistance state (L2B2) transition from the start-stand-by state (M1) to the running state (M2) if the driving assistance control section (information receiving section) 120 receives the ahead-located vehicle information that the ahead-located vehicle has started, when the running control section 160 is performing the follow-up running control with the driving assistance state of the driver's vehicle M being the second assistance state (L2B2, hand-off state) and with the operation state of the driver's vehicle M being the start-stand-by state (M1, L2B2M1).

The running control section 160 may start the driver's vehicle M to follow the ahead-located vehicle after the operation state of the driver's vehicle M transitions to the running state (M2).

According to the vehicle control apparatus 100 of the fourth aspect, if the driving assistance control section (information receiving section) 120 receives the ahead-located vehicle information that the ahead-located vehicle has started, when the running control section 160 is performing the follow-up running control with the driving assistance state of the driver's vehicle M being the hand-off state and with the operation state of the driver's vehicle M being the start-stand-by state (L2B2M1), the driver's vehicle M can be started to follow the ahead-located vehicle as soon as the ahead-located vehicle starts. As a result, the follow-up running control of the driver's vehicle M in the hand-off state can be performed appropriately.

The vehicle control apparatus 100 of a fifth aspect is in accordance with the vehicle control apparatus 100 of the first aspect or the second aspect and has a configuration in which if the driving assistance control section (information receiving section) 120 receives the ahead-located vehicle information that the ahead-located vehicle has started when the running control section 160 is performing the follow-up running control on the driver's vehicle M with the driving assistance state of the vehicle M being the first assistance state (L2B1, hand-on state) and with the operation state of the driver's vehicle M being the start-stand-by state (M1) after the driving assistance state of the driver's vehicle M transitions from the second assistance state (L2B2) to the first assistance state (L2B1), the driving assistance control section 120 has the operation state of the driver's vehicle M in the first assistance state (L2B1) transition from the start-stand-by state (M1) to the running state (M2), the running control section 160 starts the driver's vehicle M to follow the ahead-located vehicle after the operation state of the driver's vehicle M transitions to the running state (M2), and the driving assistance control section 120 requests a driver on the driver's vehicle M to operate the driving operation element as a driver requested task that is requested when the driving assistance state of the driver's vehicle is the first assistance state (L2B1), after the driving assistance control section (information receiving section) 120 receives the vehicle speed information that the driver's vehicle M has started.

The vehicle control apparatus 100 of the fifth aspect has the operation state of the driver's vehicle M in the first assistance state (L2B1) transition from the start-stand-by state (M1) to the running state (M2) if the driving assistance control section (information receiving section) 120 receives the ahead-located vehicle information that the ahead-located vehicle has started when the running control section 160 is performing the follow-up running control on the driver's vehicle M with the operation state of the driver's vehicle M being the start-stand-by state (M1) and with the driving assistance state of the driver's vehicle M being the hand-on state. As a result, the driver's vehicle M is ready to start to follow the ahead-located vehicle as soon as the ahead-located vehicle starts.

The running control section 160 starts the driver's vehicle M to follow the ahead-located vehicle M after the operation state of the driver's vehicle M transitions to the running state (M2) while performing the follow-up running control on the driver's vehicle M with the driving assistance state being the hand-on state.

The driving assistance control section 120 requests a driver on the driver's vehicle M to operate the driving operation element (hand-on state) as a driver requested task that is requested when the driving assistance state of the driver's vehicle M is the first assistance state (L2B1), if the driving assistance control section (information receiving section) 120 receives the vehicle speed information that the driver's vehicle M has started.

According to the vehicle control apparatus 100 of the fifth aspect, the operation state of the driver's vehicle M transitions from the start-stand-by state (M1) to the dunning state (M2) if the ahead-located vehicle information that the ahead-located vehicle has started is received when the follow-up running control on the driver's vehicle M is being performed with the driving assistance state of the driver's vehicle M being the hand-on state and with the operation state of the driver's vehicle M being the start-stand-by state (M1). As a result, the driver's vehicle M can start to follow the ahead-located vehicle as soon as the ahead-located vehicle starts.

In addition, the driver's vehicle M can start to follow the ahead-located vehicle M after the operation state of the driver's vehicle M transitions to the running state (M2) while performing the follow-up running control on the driver's vehicle M with the driving assistance state of the driver's vehicle M being the hand-on state, and a driver on the driver's vehicle M is requested to operate the driving operation element as a driver requested task after the vehicle speed information that the driver's vehicle has started is received. As a result, requesting the driver to operate the driving operation element (hand-on state) as a requested driver task is enabled after the driver's vehicle starts, while the driver requested task is not requested until the driver's vehicle starts.

Consequently, according to the vehicle control apparatus 100 of the fifth aspect, operating the driving operation element (hand-on state) is requested as the driver requested task that is needed at an appropriate timing that depends on the running state of the driver's vehicle M, while the driver requested task is not requested when it is not required. As a result, an autonomous driving environment that is practically useful is provided.

The vehicle control apparatus 100 of a sixth aspect is in accordance with the vehicle control apparatus 100 of the second aspect and may have a configuration in which if the operation state of the driver's vehicle transitions from the stop state (M0) to the running state (M2) when the running control section 160 is performing the follow-up running control with the driving assistance state of the driver's vehicle M being the first assistance state (L2B1) after the driving assistance state of the driver's vehicle M transitions from the second assistance state (L2B2) to the first assistance state (L2B1), the running control section 160 starts the driver's vehicle M to follow the ahead-located vehicle and the driving assistance control section 120 notifies a driver on the driver's vehicle M of a driver requested task for the driver to operate the driving operation element, the driver requested task being requested when the driving assistance state of the driver's vehicle M is the first assistance state (L2B1), after the driving assistance control section (information receiving section) 120 receives the vehicle speed information that the driver's vehicle M has started.

The running control section 160 of the vehicle control apparatus 100 of the sixth aspect starts the driver's vehicle M to follow the ahead-located vehicle after the operation state of the driver's vehicle M transitions from the stop state (M0) to the running state (M2) skipping the start-stand-by state (M1), when the running control section 160 is performing the follow-up running control with the driving assistance state of the driver's vehicle M being the first assistance state (L2B1, hand-on state) after the driving assistance state of the driver's vehicle M transitions from the second assistance state (L2B2) to the first assistance state (L2B1).

As a result, the driver's vehicle M can start to run in accordance with the driver's unambiguous intention to start after no ahead-located vehicle is confirmed.

The driving assistance control section 120 of the vehicle control apparatus 100 of the sixth aspect notifies the driver on the driver's vehicle M of a task request to operate the driving operation element (hand-on state) as a driver requested task to be requested when the driving assistance state of the driver's vehicle M is the first assistance state (L2B1), as soon as the driving assistance control section (information receiving section) 120 receives the vehicle speed information that the driver's vehicle M has started.

Thus, the driver is notified of the task request for the driver to perform a driver requested task to operate the driving operation element (hand-on state), as soon as the driving assistance control section 120 receives the vehicle speed information that the driver's vehicle M has started. Accordingly, the driver is notified at an appropriate timing of the driver requested task (operation on the driving operation element: hand-on state).

The vehicle control apparatus 100 of the sixth aspect enables the driver's vehicle M starting to run in accordance with the driver's unambiguous intention after no ahead-located vehicle is confirmed. In addition, the vehicle control apparatus 100 of the sixth aspect enables notifying the driver of the task request for the driver to perform the driver requested task to keep the hand-on state when the driving assistance control section 120 receives the vehicle speed information that the driver's vehicle M has started. Thus, the driver is notified of the driver requested task (hand-on state) at an appropriate timing. As a result, an autonomous driving environment that is practically useful is provided, as is the case with the vehicle control apparatus 100 of the fifth aspect.

The vehicle control apparatus 100 of a seventh aspect is in accordance with the vehicle control apparatuses 100 of one of the first to sixth aspects and the driving assistance control section 120 of this vehicle control apparatus 100 may be configured to stop the driving assistance state of the driver's vehicle from transitioning again for a duration from a first time point when the transition of the driving assistance state of the driver's vehicle from the second assistance state (L2B2) to the first assistance state (L2B1) is completed until a predetermined time elapses Tw after the first time point or until the driver's vehicle M runs more than a predetermined threshold distance Dth after the first time point.

The driving assistance control section 120 of the vehicle control apparatus 100 of the seventh aspect is configured to stop the driving assistance state of the driver's vehicle from transitioning again for the duration from the first time point when the transition of the driving assistance state of the driver's vehicle M from the second assistance state (L2B2) to the first assistance state (L2B1) is completed until the predetermined time elapses Tw after the first time point or until the driver's vehicle M runs more than the predetermined threshold distance Dth after the first time point.

As a result, the driving assistance control section 120 can prevent the driving assistance state of the driver's vehicle M from transitioning from the first assistance state (L2B1) back to the second assistance (L2B2), for example, immediately after the transition of the driving assistance state of the driver's vehicle M from the second assistance state (L2B2) to the first assistance state (L2B1) is completed.

Since the vehicle control apparatus 100 of the seventh aspect prevents the driving assistance state M from transitioning from the first assistance state (L2B1) back to the second assistance (L2B2), for example, immediately after the transition of the driving assistance state of the driver's vehicle M from the second assistance state (L2B2) to the first assistance state (L2B1) is completed, the vehicle control apparatus 100 can provide an autonomous driving environment with good stability, where a hunting phenomenon that causes the driving assistance state of the driver's vehicle M to switch within a short time is prevented from occurring.

The vehicle control apparatus 100 of an eighth aspect is in accordance with the vehicle control apparatus 100 of the sixth aspect and the driving assistance section 120 of this vehicle control apparatus 100 may be configured to continue to notify the driver of the task request for a predetermined notification time Tnt from a second time point when a transition of the driving assistance state of the driver's vehicle M from the second assistance state (L2B2) to the first assistance state (L2B1) gets started and stop the driving assistance state of the driver's vehicle from transitioning again until the predetermined notification time Tnt elapses after the second time point, when the transition is in a transient state.

The driving assistance section 120 of the vehicle control apparatus 100 of the eighth aspect is configured to notify the driver of the task request for a predetermined notification time from the second time point when the transition of the driving assistance state of the driver's vehicle from the second assistance state (L2B2) to the first assistance state (L2B1) gets started and stop the driving assistance state of the driver's vehicle from transitioning again until the predetermined notification time elapses after the second time point, when the transition is in a transient state.

As a result, when the transition of the driving assistance state of the driver's vehicle M from the second assistance state (L2B2) to the first assistance state (L2B1) is in a transient state before the notification of the task request is completed (when the predetermined required notification time does not elapse), the driving assistance control section 120 stops the driving assistance state of the driver's vehicle M from, for example, transitioning from the first assistance state (L2B1) back to the second assistance state (L2B2).

According to the vehicle control apparatus 100 of the eighth aspect, when the transition of the driving assistance state of the driver's vehicle M from the second assistance state (L2B2) to the first assistance state (L2B1) is in a transient state before the notification of the task request is completed (when the predetermined required notification time does not elapse), the driving assistance state of the driver's vehicle M is prevented from, for example, transitioning from the first assistance state (L2B1) back to the second assistance state (L2B2). As a result, a hunting phenomenon, which causes the driving assistance state of the driver's vehicle M to be switched before the notification of the task request is not completed, is prevented, and a stable autonomous driving environment can be provided.

OTHER EMBODIMENTS

Plural embodiments as have been described provide examples into which the present invention is implemented.

Accordingly, the scope of the present invention should not be limited by these embodiments. It should be noted that the present invention can be practiced in various embodiments without deviation from the scope or the main features of the present invention.

For instance, the vehicle control apparatus 100 of an embodiment of the present invention has been described with an example in which the driving assistance control section that is configured to determine that the driver has an unambiguous intention to start if the driving assistance control section 120 receives the accelerating operation information that the accelerating operation AC that is larger than the predetermined threshold acceleration ACth is performed over a longer time than the predetermined threshold duration CTth. However, the present invention is not limited to this example.

The driving assistance control section 120 of the vehicle control apparatus 100 may be configured to determine that the driver has an unambiguous intention to start if the driving assistance control section 120 receives the accelerating operation information that the accelerating operation AC that is larger than a predetermined threshold acceleration has been performed.

All of or part of configurations, functions, processing sections and processing means that have been described may be implemented with, for example, hardware including a dedicated integrated circuit. Alternatively, these configurations, functions, and the like are implemented with software of programs to achieve the functions that a processor interprets and executes. Information of a program, a table and a file to achieve each function may be stored in a memory, a storage device such as a hard disk and SSD (Solid State Drive), and a storage medium such as IC (Integrated Circuit) card, SD (Secure Digital card and an optical disk.

What is claimed is:

1. A vehicle control apparatus comprising a processor configured to:
   receive external world information inclusive of information on an indicative object that is ahead of a driver's vehicle in a running direction, accelerating operation information on an accelerating operation of the driver's vehicle, vehicle speed information on a vehicle speed of the driver's vehicle and ahead-located vehicle information on an ahead-located vehicle that is an object for the driver's vehicle to follow up, the ahead-located vehicle information being inclusive of information on a vehicle speed of the ahead-located vehicle;
   determine the ahead-located vehicle to be the object to follow up from the external world information that is received;
   perform running control of the driver's vehicle inclusive of follow-up running control after the ahead-located vehicle within a speed range from a stop to a predetermined vehicle speed; and
   perform a driving assistance operation using one of plural driving assistance states for assisting in driving the driver's vehicle,
   wherein the plural driving assistance states include a first assistance state that requires an operation of a predetermined driving operation element for keeping a predetermined driving assistance function enabled and a second assistance state that does not require the operation of the predetermined driving operation element for keeping the predetermined driving assistance function enabled,
   wherein the second assistance state requires no operation of a driving operation element and thus needs less driver requested tasks than the first assistance state,
   wherein any of a stop state, a start-stand-by state, and a running state is set as an operation state of the driver's vehicle in each of the first and second assistance states, the start-stand-by state being a state in which, though an accelerating operation that is larger than a predetermined threshold acceleration is performed, there is an obstacle for starting the driver's vehicle and the driver's vehicle is thus in the stop state,
   wherein when the processor is performing the follow-up running control with the driving assistance state of the driver's vehicle being the second assistance state and with the operation state of the driver's vehicle being the stop state,
   if the processor receives the accelerating operation information indicating that an accelerating operation larger than a predetermined first threshold acceleration is performed and the ahead-located vehicle information indicating that there is the ahead-located vehicle, then the processor has the operation state of the driver's vehicle transition from the stop state to the start-stand-by state with the driving assistance state of the driver's vehicle kept at the second assistance state, and
   if the processor receives the accelerating operation information indicating that an accelerating operation larger than a predetermined second threshold acceleration is performed over a longer time than a predetermined first threshold duration and the ahead-located vehicle information indicating that there is the ahead-located vehicle, then the processor has the driving assistance state of the driver's vehicle transition from the second assistance state to the first assistance state, with a request for operation of the driving operation element as the driver requested task, and has the operation state of the driver's vehicle in the first assistance state transition from the stop state to the start-stand-by state, the predetermined second threshold acceleration being greater than or equal to the predetermined first threshold acceleration.

2. The vehicle control apparatus as claimed in claim 1, wherein when the processor is performing the follow-up running control with the driving assistance state of the driver's vehicle being the second assistance state and with the operation state of the driver's vehicle being the running state, if the processor receives the vehicle speed information indicating that the vehicle speed of the driver's vehicle exceeds a predetermined threshold vehicle speed, then the processor changes the predetermined threshold acceleration to a higher acceleration.

3. The vehicle control apparatus as claimed in claim 1, wherein if the processor receives the ahead-located vehicle information that the ahead-located vehicle has started when the processor is performing the follow-up running control with the driving assistance state of the driver's vehicle being the second assistance state and with the operation state of the driver's vehicle being the start-stand-by state, then the processor has the operation state of the driver's vehicle in the second assistance state transition from the start-stand-by state to the running state and the processor starts the driver's vehicle to follow the ahead-located vehicle after the operation state of the driver's vehicle transitions to the running state.

4. The vehicle control apparatus as claimed in claim 1, wherein if the processor receives the ahead-located vehicle information that the ahead-located vehicle has started when the processer is performing the follow-up running control on the driver's vehicle with the driving assistance state of the vehicle being the first assistance state and with the operation state of the driver's vehicle being the start-stand-by state after the driving assistance state of the driver's vehicle transitions from the second assistance state to the first assistance state, the processor has the operation state of the driver's vehicle in the first assistance state transition from the start-stand-by state to the running state, the processor starts the driver's vehicle to follow the ahead-located vehicle after the operation state of the driver's vehicle transitions to the running state, and after the processor receives the vehicle speed information that the driver's vehicle has started, the processor requests a driver of the driver's vehicle to operate the driving operation element as a driver requested task that is requested when the driving assistance state of the driver's vehicle is the first assistance state.

5. The vehicle control apparatus as claimed in claim 1, wherein the processor stops the driving assistance state of the driver's vehicle from transitioning again for a duration from a first time point when the transition of the driving assistance state of the driver's vehicle from the second assistance state to the first assistance state is completed until a predetermined time elapses after the first time point or until the driver's vehicle runs more than a predetermined threshold distance after the first time point.

6. A vehicle control apparatus comprising a processor configured to:

receive external world information inclusive of information on an indicative object that is ahead of a driver's vehicle in a running direction, accelerating operation information on an accelerating operation of the driver's vehicle, vehicle speed information on a vehicle speed of the driver's vehicle and ahead-located vehicle information on an ahead-located vehicle that is an object for the driver's vehicle to follow up, the ahead-located vehicle information being inclusive of information on a vehicle speed of the ahead-located vehicle;

determine the ahead-located vehicle to be the object to follow up from the external world information that is received;

perform running control of the driver's vehicle inclusive of follow-up running control after the ahead-located vehicle within a speed range from a stop to a predetermined vehicle speed; and perform a driving assistance operation using one of plural driving assistance states for assisting in driving the driver's vehicle, wherein the plural driving assistance states include a first assistance state that requires an operation of a predetermined driving operation element for keeping a predetermined driving assistance function enabled and a second assistance state that does not require the operation of the predetermined driving operation element for keeping the predetermined driving assistance function enabled, wherein the second assistance state requires no operation of a driving operation element and thus needs less driver requested tasks than the first assistance state, wherein any of a stop state, a start-stand-by state, and a running state is set as an operation state of the driver's vehicle in each of the first and second assistance states, the start-stand-by state being a state in which, though an accelerating operation that is larger than a predetermined threshold acceleration is performed, there is an obstacle for starting the driver's vehicle and the driver's vehicle is thus in the stop state, wherein when the processor is performing the follow-up running control with the driving assistance state of the driver's vehicle being the second assistance state and with the operation state of the driver's vehicle being the stop state, if the processor receives the accelerating operation information indicating that an accelerating operation larger than a predetermined first threshold acceleration is performed and the ahead-located vehicle information indicating that there is the ahead-located vehicle, then the processor has the operation state of the driver's vehicle transition from the stop state to the start-stand-by state with the driving assistance state of the driver's vehicle kept at the second assistance state, if the processor receives the accelerating operation information indicating that an accelerating operation larger than a predetermined second threshold acceleration is performed over a longer time than a predetermined first threshold duration and the ahead-located vehicle information indicating that there is the ahead-located vehicle, then the processor has the driving assistance state of the driver's vehicle transition from the second assistance state to the first assistance state and has the operation state of the driver's vehicle in the first assistance state transition from the stop state to the start-stand-by state, and if the processor receives the accelerating operation information indicating that an accelerating operation larger than a predetermined third threshold acceleration is performed over a longer time than a predetermined second threshold duration and the ahead-located vehicle information indicating that there is no ahead-located vehicle, then the processor has the driving assistance state of the driver's vehicle transition from the second assistance state to the first assistance state, with a request for operation of the driving operation element as the driver requested task, and has the operation state of the driver's vehicle in the first assistance state transition from the stop state to the running state, the predetermined second threshold acceleration being greater than or equal to the predetermined first threshold acceleration, the predetermined third threshold acceleration being greater than or equal to the predetermined second threshold acceleration, and the predetermined second threshold duration being greater than or equal to the predetermined first threshold duration.

7. The vehicle control apparatus as claimed in claim 6, wherein if the operation state of the driver's vehicle transitions from the stop state to the running state when the processor is performing the follow-up running control with the driving assistance state of the driver's vehicle being the first assistance state after the driving assistance state of the driver's vehicle transitions from the second assistance state to the first assistance state, then the processor starts the driver's vehicle to follow the ahead-located vehicle, and after the processor receives the vehicle speed information that the driver's vehicle has started, the processor notifies a driver of the driver's vehicle of a driver requested task for the driver to operate the driving operation element, the driver requested task being requested when the driving assistance state of the driver's vehicle is the first assistance state.

8. The vehicle control apparatus as claimed in claim 7, wherein when a transition of the driving assistance state of the driver's vehicle from the second assistance state to the first assistance state is in a transient state, the processor continues to notify the driver of the task request for a predetermined notification time from a second time point when the transition gets started and stops the driving assistance state of the driver's vehicle from transitioning again until the predetermined notification time elapses after the second time point.

9. The vehicle control apparatus as claimed in claim 6, wherein when the processor is performing the follow-up running control with the driving assistance state of the driver's vehicle being the second assistance state and with the operation state of the driver's vehicle being the running state, if the processor receives the vehicle speed information indicating that the vehicle speed of the driver's vehicle exceeds a predetermined threshold vehicle speed, then the processor changes the predetermined threshold acceleration to a higher acceleration.

10. The vehicle control apparatus as claimed in claim 6, wherein if the processor receives the ahead-located vehicle information that the ahead-located vehicle has started when the processor is performing the follow-up running control with the driving assistance state of the driver's vehicle being the second assistance state and with the operation state of the driver's vehicle being the start-stand-by state, then the processor has the operation state of the driver's vehicle in the second assistance state transition from the start-stand-by state to the running state and the processor starts the driver's vehicle to follow the ahead-located vehicle after the operation state of the driver's vehicle transitions to the running state.

11. The vehicle control apparatus as claimed in claim 6, wherein
if the processor receives the ahead-located vehicle information that the ahead-located vehicle has started when the processor is performing the follow-up running control on the driver's vehicle with the driving assistance state of the vehicle being the first assistance state and with the operation state of the driver's vehicle being the start-stand-by state after the driving assistance state of the driver's vehicle transitions from the second assistance state to the first assistance state,
the processor has the operation state of the driver's vehicle in the first assistance state transition from the start-stand-by state to the running state,
the processor starts the driver's vehicle to follow the ahead-located vehicle after the operation state of the driver's vehicle transitions to the running state, and
after the processor receives the vehicle speed information that the driver's vehicle has started, the processor requests a driver of the driver's vehicle to operate the driving operation element as a driver requested task that is requested when the driving assistance state of the driver's vehicle is the first assistance state.

* * * * *